Patented Apr. 3, 1928.

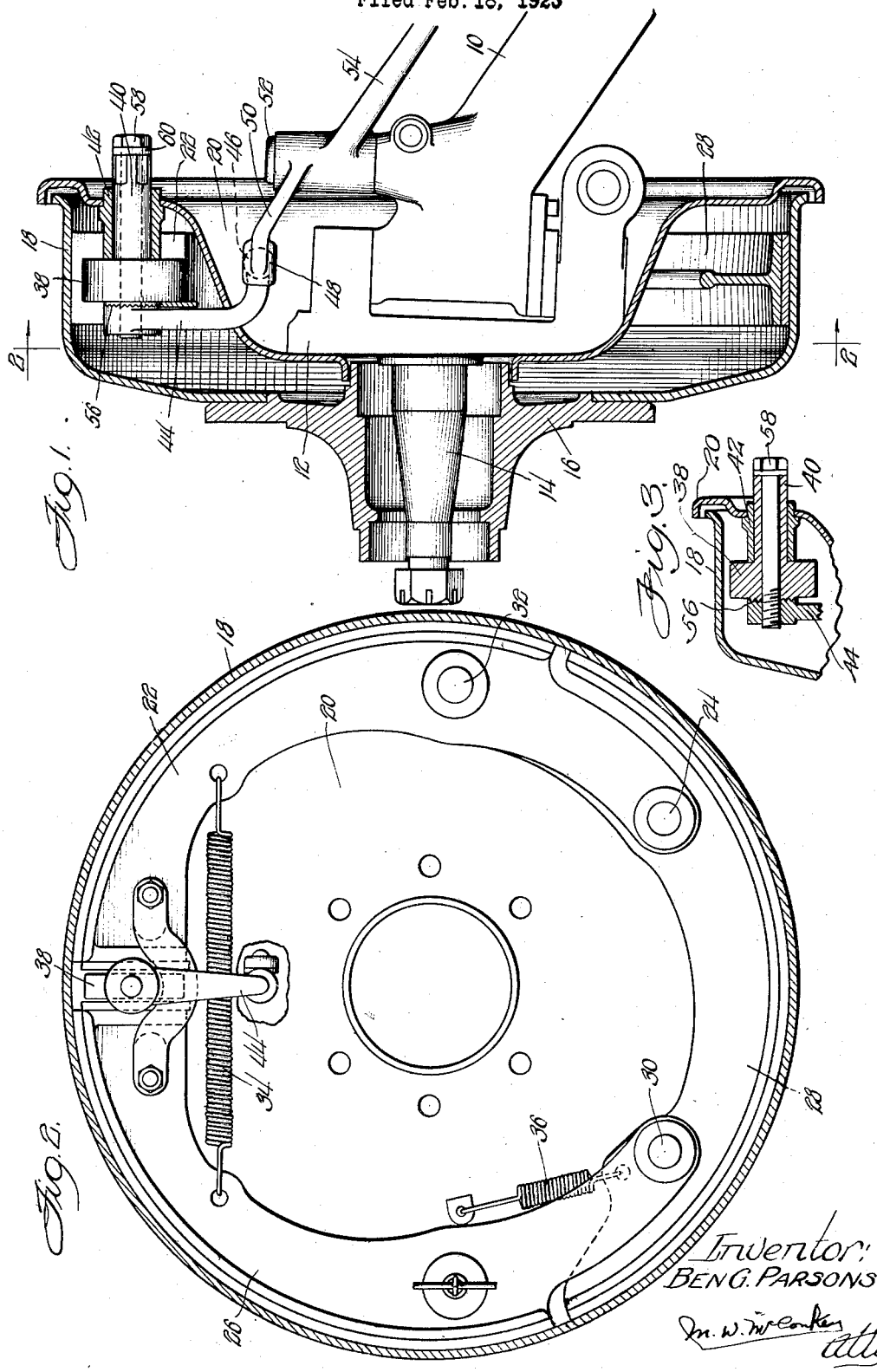

1,664,828

UNITED STATES PATENT OFFICE.

BEN G. PARSONS, OF SOUTH BEND, INDIANA, ASSIGNOR TO THE BENDIX BRAKE COMPANY.

ADJUSTABLE CAM FOR BRAKES.

Application filed February 18, 1925. Serial No. 10,017.

This invention relates to brakes, and is illustrated as embodied in a front wheel brake for an automobile. An object of the invention is to provide a simple means for adjusting the brake-operating connections, such as a cam, preferably from outside the brake drum. In one desirable arrangement, the angular relationship between an operating arm forming part of the brake connections, and the cam or equivalent brake-operating device, can be varied by turning an adjusting member, preferably extending outside the brake drum, and the adjustment so made may be maintained by tightening up a nut or the like. In the particular arrangement illustrated, the arm and cam have interlocking teeth, and the adjustment is made by tightening up one or more teeth. While not necessarily limited to such use, this arrangement is especially desirable in adjusting, with respect to the cam, an arm terminating above and substantially in line with the king pin about which the front wheel swivels, in order to take up for wear of the brake linings without disturbing the position of the end of the arm in line with the king pin.

The above and other objects and features of the invention, including various novel combinations of parts and desirable particular constructions, will be apparent from the following description of one illustrative embodiment shown in the accompanying drawings, in which:

Figure 1 is a vertical section transversely of part of an automobile chassis, showing part of one front wheel and its brake in vertical section;

Figure 2 is a vertical section on the line 2—2 of Figure 1, showing the brake parts in side elevation; and Figure 3 is a longitudinal section through the cam and its shaft.

In the arrangement selected for illustration, the chassis includes a front axle 10 having a knuckle 12 swivelled thereto by the usual king pin, the knuckle having a spindle 14 on which is mounted the wheel 16. The wheel carries the brake drum 18, and the knuckle has a backing plate 20 supporting the stationary parts of the brake.

The illustrated brake includes a reverse shoe 22 pivotally anchored at 24, and a pair of shoes 26 and 28 pivotally connected at 30 and pivotally anchored at 32. The anchor 32 passes through a relatively large opening in the shoe 22, and the anchor 24 passes through a similar opening in the shoe 28. The shoes are normally held in released or idle position by springs 34 and 36.

The shoes are spread apart, to apply the brake, by a device such as a cam 38 arranged between the free ends of shoes 22 and 26, the cam being mounted on the inner end of a hollow shaft 40 journalled in a bracket 42. The bracket 42 may be carried by the backing plate 20. The cam is operated by a lever arm 44 terminating in a ball end 46 above and substantially in line with the king pin, the end 46 being operatively engaged by a flattened surface on the end of an arm 50 forming part of lever pivoted at 52 on the front axle, and having an arm 54 operatively connected to the brake pedal or other brake-applying means.

According to the present invention, cam 38 and arm 44 are relatively angularly adjustable, to take up for wear of the brake lining without changing the position of the joint 46—48. In the arrangement shown in the drawings, the arm and cam are provided with cooperating teeth 56, and they are normally clamped together in any desired position of adjustment by means of a cap screw 58 threaded into arm 44 and passing through the hollow shaft 40, preferably with a lock washer 60. By loosening cap screw 58, shaft 40 may be turned by a wrench to take up one or two teeth, the adjustment so made being maintained by again tightening up the screw 58. Obviously a nut and bolt may be substituted for the cap screw 58.

While one illustrative embodiment of the invention has been described in detail, it is not my intention to limit its scope to that particular embodiment, or otherwise than by the terms of the appended claims.

I claim:

1. A brake comprising, in combination, a drum and backing plate, friction means between the drum and backing plate, a device for operating the friction means, an operating arm on the drum side of said device, and means on the outside of the backing plate for adjusting the relative angular positions of the arm and cam.

2. A brake comprising, in combination, a drum and backing plate, friction means between the drum and backing plate, a device for operating the friction means, a sleeve carrying said device, an operating arm on the opposite side of said device from the sleeve, and a clamping bolt extending through the device and sleeve for holding the device and arm in any desired adjusted relative angular positions.

3. A brake having, in combination, a drum and a backing plate, friction means between the drum and backing plate, a device for operating the friction means, a sleeve supported by and extending through the backing plate and carrying the device, an operating arm adjacent the device, and a bolt extending through the sleeve and holding the device and arm in any desired relative angular positions.

4. A brake having, in combination, a drum and a backing plate, friction means between the drum and backing plate, a device for operating the friction means, a sleeve supported by the backing plate and carrying the device, an operating arm on the other side of the device, and a bolt extending through the sleeve and arm and holding the device and arm in any desired relative angular positions.

In testimony whereof I have hereunto subscribed my name.

BEN G. PARSONS.